Patented July 18, 1944

2,353,924

UNITED STATES PATENT OFFICE 2,353,924

METHOD OF PRODUCING EDIBLE COMPOSITIONS

Frank E. Parker, Duluth, Minn., assignor to Hanson Fish Products Company, Minneapolis, Minn., a corporation of Minnesota No Drawing. Application April 22, 1943, Serial No. 484,109

2 Claims. (Cl. 99—111)

This invention relates to a novel edible compound and has special reference to such a comestible particularly adapted for use as a spread for sandwiches, et cetera.

The principal object of the invention is to provide a specially delectible spread of this type having a delicate flavor of smoked fish.

Inasmuch as the various kinds of salmon have a flavor much sought after and desired by those fond of fish, it has been found by elaborate and extensive experimentation that the use of a certain proportion of smoked silver salmon as found in the market together with a mixture of red Alaska canned salmon and Cohoe canned salmon results in a very satisfastory flavor, the smoked salmon, being the least of the three, producing an exceptionally desirable element having a tendency to whet the appetite for more. The other two portions of salmon with their well known and cherished flavor combine to produce the ultimate desired result.

In the preparation of the spread the smoked salmon is first ground, then mixed with the other two in the following proportions:

| | Parts |
|---|---|
| Smoked salmon | 4 |
| Red Alaska canned salmon | 7½ |
| Cohoe canned salmon | 7½ |

This mixture is then thoroughly ground, usually requiring two grindings through an ordinary meat grinder. In this thorough grinding process it is found that the otherwise surplus fat or oil in the canned salmon is absorbed, and as soon as possible after the grinding process, the ground product is placed within suitable small glass containers usually of the 4 oz. type and vacuum capped, when they are collectively placed within a pressure vapor retort.

The retort is then closed and a stream pressure of from 20 to 23 pounds is applied, and the temperature slowly brought up to 230° F. where it is maintained for about 35 minutes.

This process thoroughly sterilizes the product and renders it capable of withstanding any atmospheric temperatures for a long period of time.

From the foregoing, it is apparent that I have devised a method of uniting a lesser quantity of smoked salmon with a larger quantity of like material, but unsmoked, which results in a more subtle and to many, a more pleasing and delicate smoke flavor to the entire mass, the novel steps of preparation being more clearly set forth in the appended claims.

Having thus described my invention, what I claim and desire to secure by Letters Patent, is:

1. A method of producing an edible composition which comprises grinding a quantity of smoked salmon meat, thereby producing a mass of finely divided desiccated particles; mixing said mass with a quantity of a mass of coarsely divided particles of canned salmon meat, thereby causing the finely divided particles to absorb a large proportion of the fish oil adhered to the particles of canned salmon meat; and grinding the coarse particles of canned salmon meat, thereby producing a homogeneous plastic mass.

2. A method of producing an edible composition which comprises grinding a quantity of smoked salmon meat, thereby producing a mass of finely divided desiccated particles; mixing said mass with a quantity of a mass of coarsely divided particles of canned salmon meat, thereby causing the finely divided particles to absorb a large proportion of the fish oil adhered to the particles of canned salmon meat, whereby the absorbed oil suffuses said finely divided particles thereby increasing their sapidity; and grinding the coarse particles of canned salmon meat, thereby intimately relating the finely divided treated particles of smoked salmon with the finely divided particles of the canned salmon meat, thereby impregnating the particles of canned salmon meat with the sapid quality of the particles of the smoked salmon meat and producing a homogeneous plastic mass.

FRANK E. PARKER.